(12) United States Patent
Mackay

(10) Patent No.: US 6,908,273 B2
(45) Date of Patent: Jun. 21, 2005

(54) SECURITY FIXING FOR MACHINE GUARD

(76) Inventor: Sean Kenneth Mackay, 189 Oldwood Place, Eliburn, Livingston, West Lothian (GB), EH54 6UX (*) Notice: Subject to any disclaimer, the term of this patent is extended or adjusted under 35 U.S.C. 154(b) by 0 days.

(21) Appl. No.: 10/312,485

(22) PCT Filed: Jun. 21, 2001

(86) PCT No.: PCT/GB01/02726
§ 371 (c)(1),
(2), (4) Date: Mar. 3, 2003

(87) PCT Pub. No.: WO01/98674
PCT Pub. Date: Dec. 27, 2001

(65) Prior Publication Data
US 2003/0165372 A1 Sep. 4, 2003

(30) Foreign Application Priority Data
Jun. 23, 2000 (GB) .............................................. 0015267

(51) Int. Cl.⁷ ............................................... F16B 41/00
(52) U.S. Cl. ...................................... 411/432; 411/910
(58) Field of Search .............................. 411/303, 372.5, 411/372.6, 373, 377, 386, 402, 411, 428, 429, 432, 531, 910; 70/14, 18, 19, 158, 163, 164; 81/120, 532

(56) References Cited

U.S. PATENT DOCUMENTS

| | | | |
|---|---|---|---|
| 1,447,564 A | | 3/1923 | Frank et al. |
| 3,079,830 A | * | 3/1963 | Faroni et al. ............... 411/427 |
| 3,492,841 A | * | 2/1970 | Ipri .............................. 70/231 |
| 3,519,979 A | * | 7/1970 | Bodenstein .................. 439/133 |
| 4,352,614 A | * | 10/1982 | Hirsch .......................... 411/427 |
| 4,580,935 A | * | 4/1986 | Treihaft .......................... 410/3 |
| 4,600,343 A | * | 7/1986 | Frerejacques ............... 411/303 |
| 4,986,712 A | * | 1/1991 | Fultz .......................... 411/428 |
| 5,112,176 A | * | 5/1992 | McCauley et al. .......... 411/432 |
| 5,340,256 A | * | 8/1994 | Morgan ....................... 411/405 |
| 5,595,466 A | | 1/1997 | Dehaitre |
| 5,628,602 A | * | 5/1997 | Ohsawa ....................... 411/405 |
| 5,890,859 A | * | 4/1999 | Hasnik ........................ 411/372 |
| 6,571,588 B1 | * | 6/2003 | Yuen ........................... 70/233 |

FOREIGN PATENT DOCUMENTS

| | | |
|---|---|---|
| DE | 37 01 574 A | 8/1988 |
| DE | 93 19 251 U | 2/1994 |
| GB | 722 029 A | 1/1955 |

* cited by examiner

Primary Examiner—Robert J. Sandy
Assistant Examiner—Ruth C. Rodriguez
(74) Attorney, Agent, or Firm—Ware, Fressola, Van der Sluys & Adolphson LLP

(57) ABSTRACT

A releasable security fixing system comprising a bolt (3) having a head and a shank. A security nut (7) which is engageable threadingly with the shank of the bolt and a cupped collar (5) having a hole in the cupped end to fit over the shank of the bolt and having a length greater than the projecting end of the shank of the bolt when installed, and being open at the other end to receive the security nut. The security nut has a circular periphery and is provided with a plurality of grooves (77) cut into one end of the nut and extending away from said end. A complimentary key (10) is provided for fitting and releasing the nut. The shank of the bolt is such that, in use, the shank of the bolt projects beyond the security nut in its installed position, and the key having an aperture to receive the projecting end of the bolt shank.

18 Claims, 4 Drawing Sheets

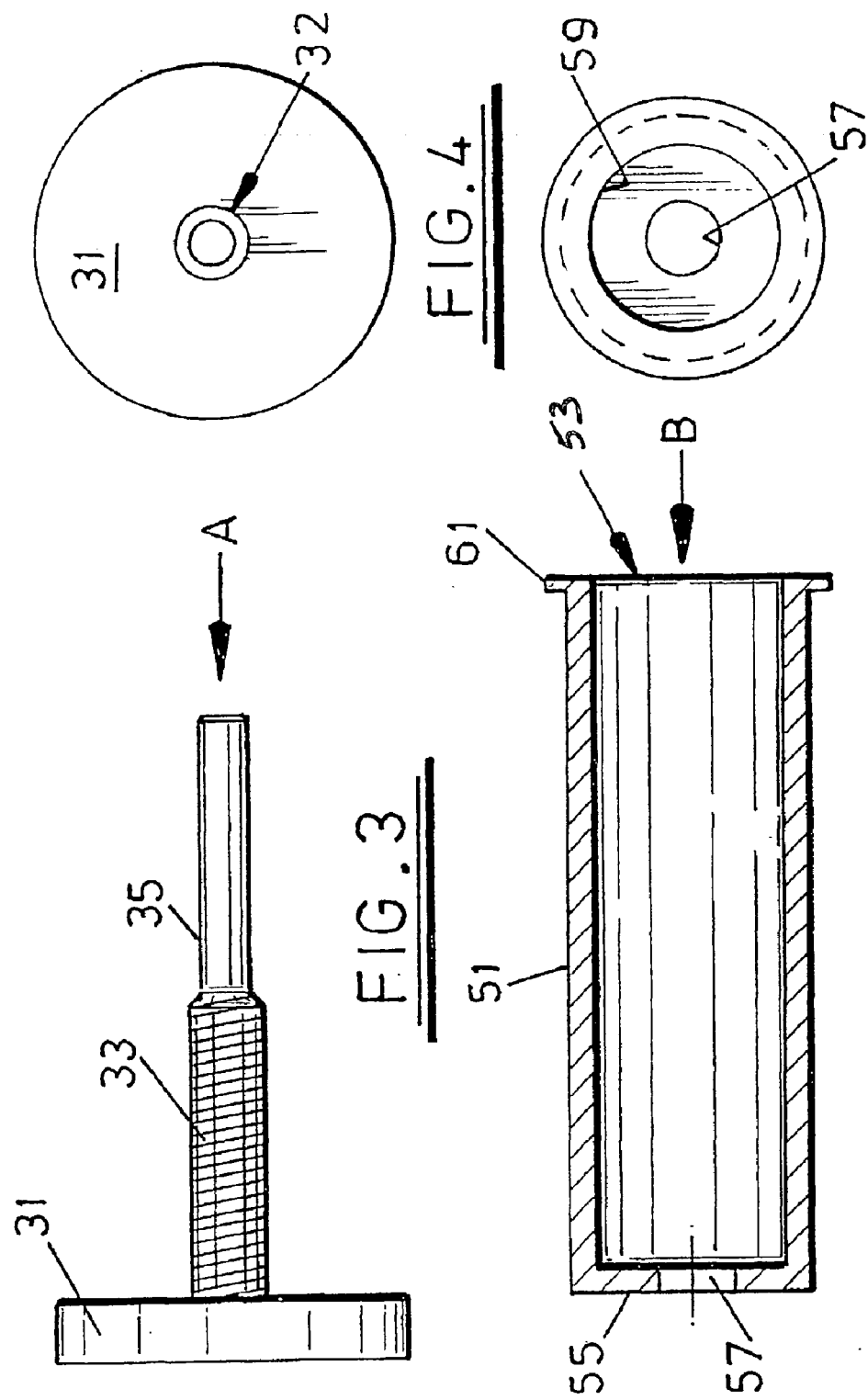

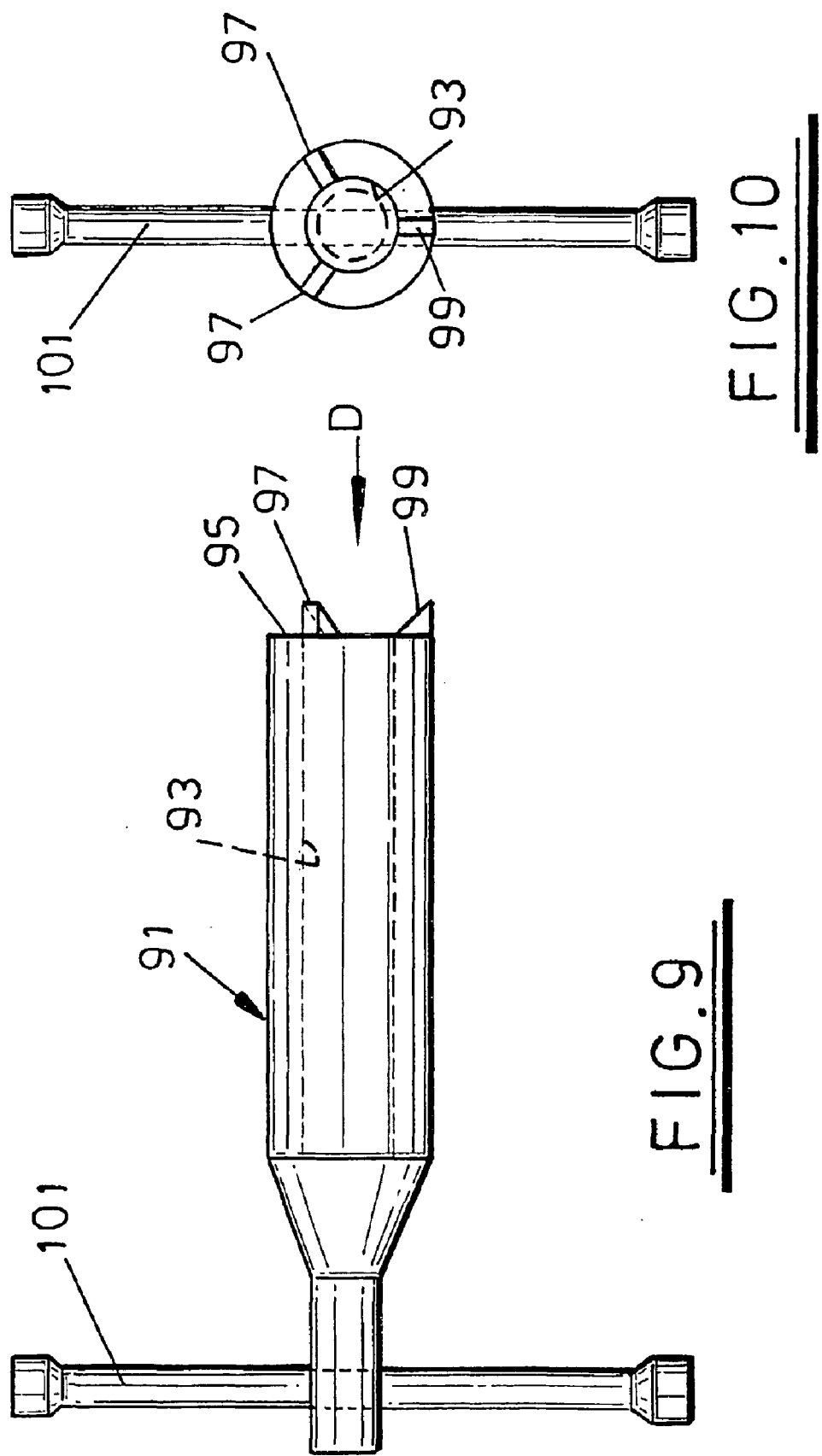

SECURITY FIXING FOR MACHINE GUARD

BACKGROUND OF THE INVENTION

1. Technical Field
2. Description of the Background Art

Many machines are fitted with guards as a safety measure. For example mesh guards are fitted over moving parts of a machine. The guards have to be legitimately removed for maintenance purposes and to rectify faults and therefore have to be provided with releasable fixings. However, most usually they are provided with fixings which can be released with conventional spanners and wrenches. As a consequence non-authorized personnel can remove the guards and this may result in the guards being removed without following the best procedures as regards safety.

Nuts which require special tools to remove them are known but examples I have used having three small holes in a circular nut with which three pins of a corresponding tool co-operate have not proved satisfactory in applications involving resistance to vibration where high torque loadings are required on the nut to resist those vibrations.

SUMMARY OF THE INVENTION

The present invention aims to provide a solution.

Accordingly, the present invention provides a releasable security fixing system comprising a bolt having a head and a shank, a security nut which is engageable threadingly with the shank of the bolt, a cupped collar having a hole in the cupped end to fit over the shank of the bolt and having a length greater than the projecting end of the shank of the bolt when installed, and being open at the other end to receive the security nut, the security nut having a circular periphery and provided with a plurality of grooves cut into one end of the nut and extending away from said end, and further comprising a complimentary key for fitting and releasing the nut, the shank of the bolt being such that, in use, the shank of the bolt projects beyond the security nut in its installed position, and the key having an aperture to receive the projecting end of the bolt shank.

More particularly, the grooves extend in from the periphery of the nut. The periphery of the nut may have parallel sides or converge towards said end. Radially inner faces of the grooves are preferably inclined so that the radial depth of the groove is greatest at said end. Any number of grooves may be provided, but preferably three grooves are provided. They may be equally or randomly spaced around the periphery of the nut.

More particularly still, the security nut incorporates an anti-rotation means. This may comprise a plastic element for gripping the threaded shank of the bolt or any other means. For ease of installation the shank of the bolt has a threaded portion and a non-threaded portion of reduced diameter disposed between the threaded portion and a free end of the shank.

As a further security measure, the collar may have a sleeve fitted about its periphery. The sleeve is preferably constructed from a plastic material. Preferably the sleeve is rotatable on the collar. I have found that if a reasonably soft plastic is used, the application of a gripping wrench to the sleeve results in the sleeve turning instead of the collar. The collar and sleeve may be of the same or different materials. The materials may be chosen to make the collar and/or sleeve highly visible.

As a further security measure I propose to fit a low friction washer under the security nut between it and the cupped end of the collar so that if the collar is turned the turning movement is not transferred to the security nut. In an alternative embodiment the collar is provided with a protrusion which co-operates with a reception location of the component to be secured e.g. the mesh of a guard, to prevent rotation of the collar. The protrusion conveniently comprises a pin extending from the base of the cupped collar.

I prefer the bolt to be fixed non-rotatably to a secure anchoring point of the component to which the removable guard is releasably secured. Conveniently it is fixed by welding.

I further prefer to have a dust cover which fits into the open end of the collar. This is conveniently made of plastic and I prefer to provide a security strap which has to be removed in order to remove the dust cover. A tie-wrap may be used for this purpose. I prefer to have the security strap and the dust cover in different colors so that it is quickly apparent if the security strap has been removed.

As part of the security procedures I propose that the key for removal of the guard fixing is kept under the supervision of a security officer so that its release and subsequent use can be supervised and appropriate action taken to ensure that the machinery is rendered safe whilst the key is released.

Different lengths of bolt and collar are available. The overall size of the product may be scaled up or down to suit intended applications.

BRIEF DESCRIPTION OF THE DRAWINGS

The present invention will now be described further by way of example only with reference to the accompanying drawings in which:

FIGS. 3 and 4 are a side view and an end view on A of FIG. 3 of a bolt used in the fixing system of the present invention, FIGS. 5 and 6 are a cross-sectional side view an end view on B of FIG. 5 of a collar used in the fixing system of the present invention, FIGS. 9 and 10 are a side view and end view on D of FIG. 9 of a key for use in a fixing system of the present invention.

DETAILED DESCRIPTION OF THE INVENTION

Figure 1:
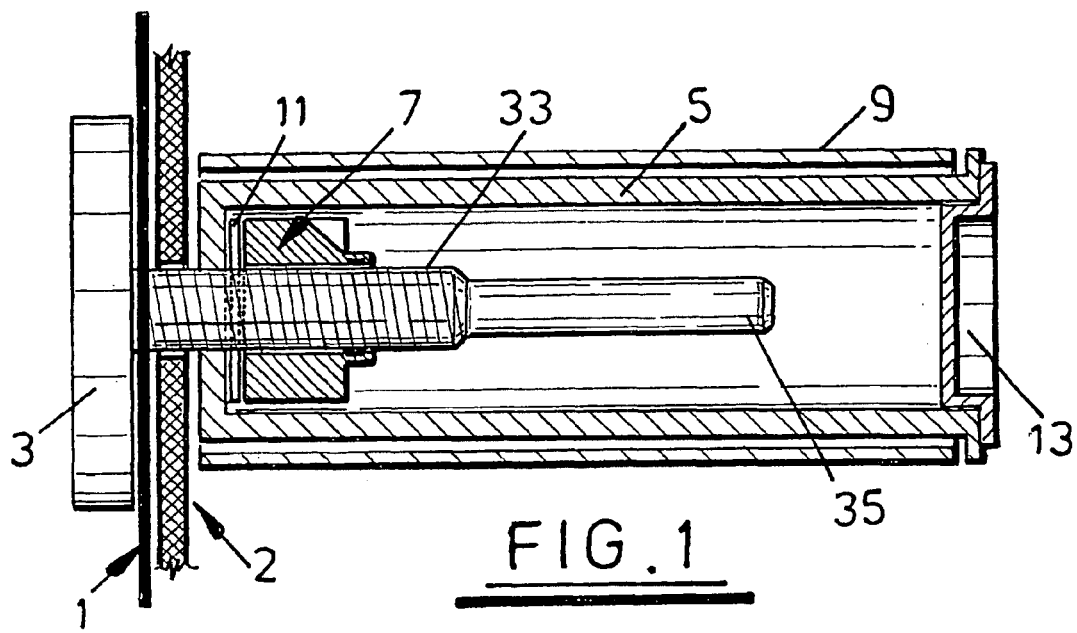
FIG. 1 is a schematic cross-sectional view of a security fixing system according to the present invention.
Figure 2:
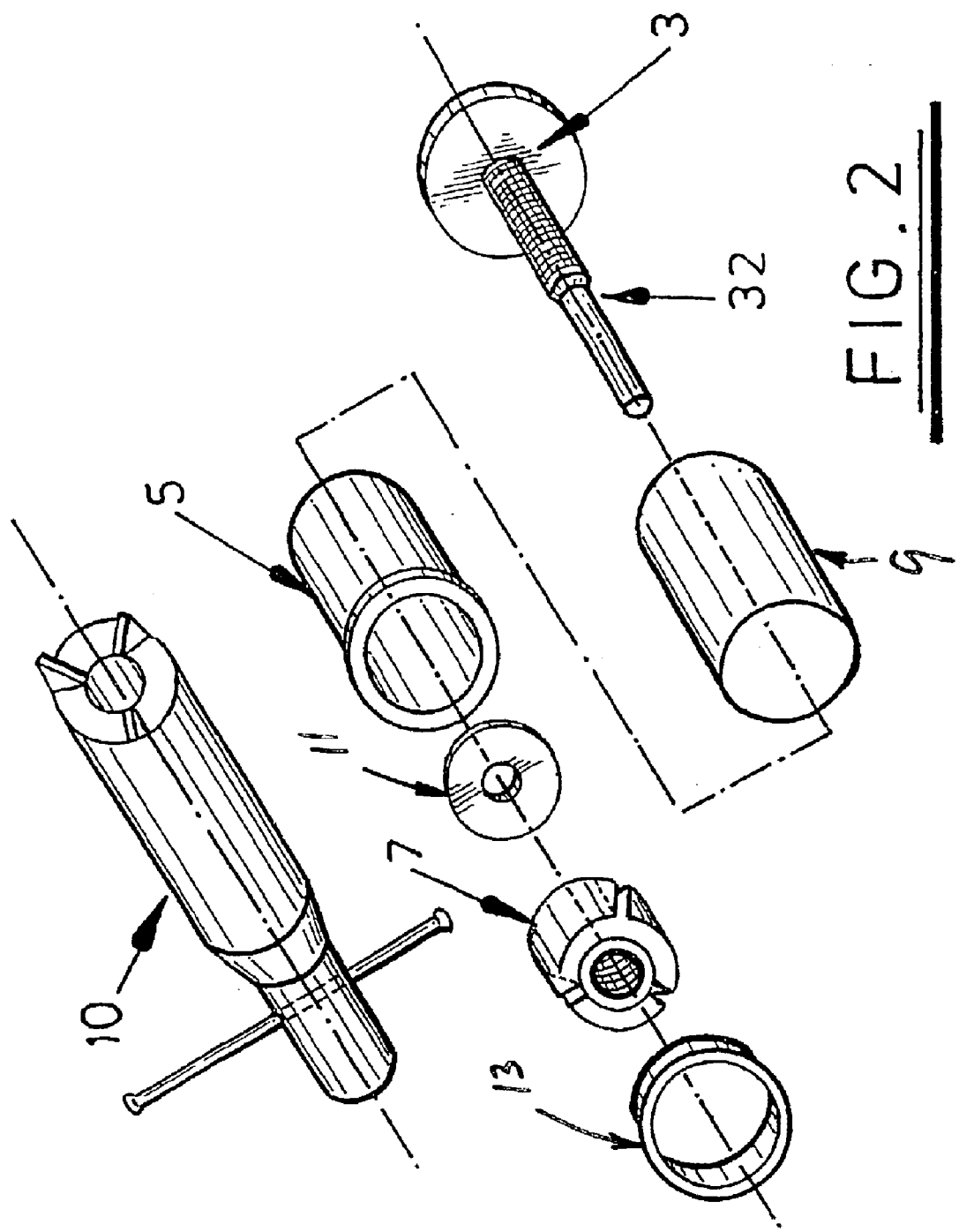
FIG. 2 is an exploded perspective view of the components of the security fixing system according to the present invention.

The present invention will now be described with regard to a security fixing for securing a removable guard with respect to a fixed guard or other secure anchoring point. In FIG. 1 the fixed guard is shown at 1 and the removable guard, which may be a mesh screen, is shown at 2. The components of the fixing system also shown in FIG. 2 comprise a bolt 3, a cupped collar 5, a security nut 7, a washer 11 and a dust cap 13.

The bolt, also shown in FIGS. 3 and 4 comprises a circular flat head 31 and a stepped diameter shank 32 having a threaded portion 33 and a non-threaded portion 35. The cupped collar, also shown in FIGS. 5 and 6, has a hollow cylindrical portion 51 which is fully open at one end 53 and partially closed at the other end by an end wall 55 having a co-axial through bore 57. The internal bore 59 of the sleeve 51 is sufficiently large to receive the nut 7. The open end 53 of the collar is provided with an outwardly turned lip 61 which serves as a retainer for the sleeve 9 (FIG. 1). The sleeve 9 is a plain cylindrical sleeve made of plastics material which is received rotatably on the outer periphery of the sleeve 51. The collar is made from a robust metal which resists crushing.

Figures 7, 8:
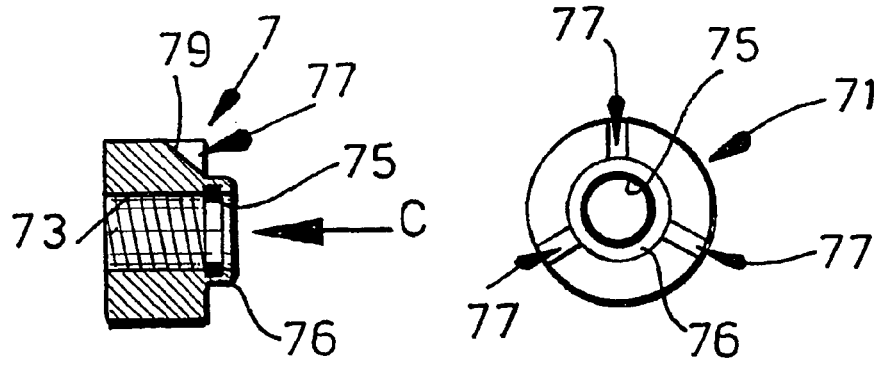
FIGS. 7 and 8 are a side view and an end view on C of FIG. 7 of a nut used in the fixing system.

Nut 7, as shown in more detail in FIGS. 7 and 8, has a circular periphery 71, a threaded through bore 73 to compliment the threading of threaded shank portion 33 of the bolt 3 and is further provided with an anti-rotational element 75 comprising an annular material made of plastic received in a turned over end portion 76 of the nut 7. One end of the nut has three grooves 77 formed therein. The grooves have a tapered end face 79. It will be seen that they extend from the end of the nut and from the periphery of the nut.

A tool 10 for fitting and removing the nut 7 is shown in FIGS. 9 and 10 and comprises a cylindrical body portion 91 having an internal bore 93 extending from an end face 95 of the body 91. Three tabs 97 project from the end face 95 and have a width of a dimension to be received within the width of the grooves 77 of nut 7 and they have an inclined face 99 angled to match the inclined face 79 of the grooves 77 in the nut 7. The illustrated embodiment of the tool is shown with a T-bar 101 for rotation thereof. As an alternative, a standard ratchet drive may be incorporated or it may be provided with a socket to receive a standard ratchet drive tool in place of the T-bar. Small scale versions could be adapted to fit a screwdriver.

Figure 11:
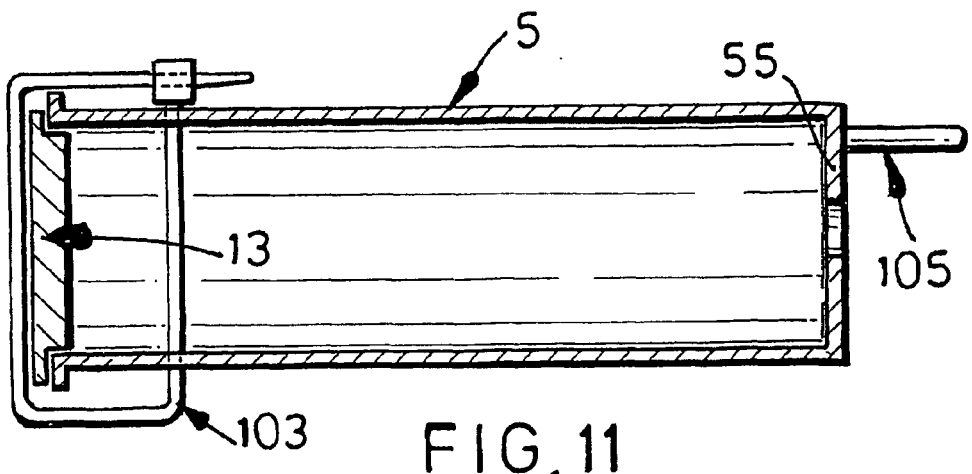
FIG. 11 is a schematic cross-sectional side view of a collar incorporating optional alternative security provisions.

In use the bolt 3 is positioned with respect to the anchoring point of one component 1 with respect to which the guard 2 is to be removably secured. Usually the bolt 3 will pass through a bore in the anchoring component and it may be fixedly secured in place, for example by welding. The removable guard element 2 is then placed over the shank of the bolt 3 followed by the cupped collar 5 to which the sleeve 9 has been fitted. The sleeve can be slid on from the cupped end. The washer 11 is then placed onto the shank and the nut 7 is placed onto the shank and the protrusions 99 of the key 9 engaged with the grooves 77 of the nut 7 so that it can be threaded onto the threaded portion 33 of the shank. The protrusions 97 are particularly resistant to deformation and can readily apply the desired fixing torque to the nut 7. Once the nut is in place the dust cover 13 is fitted to the open end of the collar and in a preferred option, as illustrated in FIG. 11, a cable tie 103 is passed through holes (not illustrated) in the sleeve and collar and then around and over the dust cover 13 so that the dust cover cannot be removed without removal of the wire tie. The right-hand end of FIG. 11 also illustrates and alternative configuration for the collar which is provided with a pin 105 which projects from the end 55 of the collar and is intended for co-operating engagement with a reception portion of the removable guard and/or the secure anchoring point to prevent rotation of the collar 5. The aforementioned sleeve may or may not be provided in such an embodiment.

I prefer to have the dust cap and the collar in contrasting colors for example black and red and to have the tie wrap, where provided, in yet another contrasting color so that removal of the tie wrap and/or the dust cap is readily apparent. I have in mind using a red sleeve, a black dust cap and a yellow tie wrap although other color combinations could be equally suitable.

By keeping the release key under the control of a safety supervisor it is difficult to envisage how the guard could be removed inadvertently since the fact that the fixing bolt has an extended shank which is surrounded by the collar makes it impossible to release the nut other than by means of the special key.

What is claimed is:

1. A releasable security fixing system comprising:
   (a) a bolt having a head and a shank with a threaded portion and a non-threaded reduced diameter portion;
   (b) a security nut which is engagable threadingly with the threaded portion of the shank of the bolt such that, in use, the non-threaded reduced diameter portion of the shank of the bolt projects beyond the security nut in its installed position, the security nut having circular periphery and provided with a plurality of grooves cut into one end of the nut and extending away from the one end;
   (c) a cupped collar having a hole in a cupped end to fit over the shank of the bolt and having a length greater than a projecting end of the shank of the bolt when installed, and an open end defining a bore to receive the security nut such that the circular periphery of the security nut extends into close conformity with the bore of the collar,
   (d) a sleeve fitted about a periphery of the collar; and
   (e) complimentary key for fitting and releasing the nut, the key having an aperture to receive the projecting end of the bolt shank.

2. A releasable security fixing system as claimed in claim 1 in which the grooves extend in from the periphery of the nut.

3. A releasable security fixing system as claimed in claim 1 in which the grooves in the periphery of the nut are defined by parallel sides.

4. A releasable security fixing system as claimed in claim 1 in which radially inner faces of the grooves are inclined so that radial depths of the grooves are greatest at the one end.

5. A releasable security fixing system as claimed in claim 1 in which the grooves are equally spaced around the periphery of the nut.

6. A releasable security fixing system as claimed in claim 1 in which the security nut incorporates an anti-rotation means.

7. A releasable security fixing system am claimed in claim 1 in which the sleeve is made of a plastic material.

8. A releasable security fixing system as claimed in claim 1 in which the sleeve is rotatable on the collar.

9. A releasable security fixing system am claimed in claim 1 in which a low friction washer is fitted under the security nut between the security nut and the cupped end of the collar.

10. A releasable security fixing system as claimed in claim 1 in which the collar is provided with a protrusion which cooperates with a reception location of a component to be secured.

11. A releasable security fixing system as claimed in claim 10 in which the protrusion comprises a pin extending from a base of the cupped collar.

12. A releasable security fixing system as claimed in claim 1 in which, in use, the bolt in fixed non-rotatably to a secure anchoring point of a component to which a removable guard is releasably secured.

13. A releasable security fixing system as claimed in claim 1 in which a dust cover is fitted into the open end of the collar.

14. A releasable security fixing system as claimed in claim 13 in which a security strap secures the dust cover in place.

15. A releasable security fixing system as claimed in claim 14 in which the security strap comprises a tie-wrap.

16. A releasable security fixing system as claimed in claim 14 in which the security strap end the dust cover are different colors.

17. A releasable security fixing system comprising:
(a) a bolt having a head and a shank with a threaded portion and a non-threaded reduced diameter portion;
(b) a security nut which is engageable threadingly with the threaded portion of the shank of the bolt such that, in use, the non-threaded reduced diameter portion of the shank of the bolt projects beyond the security nut in its installed position, the security nut having a circular periphery end provided with a plurality of grooves cut into one end of the nut and extending away from the one end;
(c) a cupped collar having a hole in a cupped end to fit over the shank of the bolt and having a length greater than a projecting end of the shank of the bolt when installed, and an open end defining a bore to receive the security nut such that the circular periphery of the security nut extends into close conformity with the bore of the collar;
(d) a protrusion provided on the collar which cooperates with a reception location of a component to be secured; and
(e) a complimentary key for fitting and releasing the nut, the key having an aperture to receive the projecting end of the bolt shank.

18. A releasable security fixing system comprising:
(a) a bolt having a head and a shank with a threaded portion and a non-threaded reduced diameter portion;
(b) a security nut which is engagable threadingly with the threaded portion of the shank of the bolt such that, in use, the non-threaded reduced diameter portion of the shank of the bolt projected beyond the security nut in its installed position, the security nut having a circular periphery and provided with a plurality of grooves cut into one end of the nut and extending away from the one end;
(c) a cupped collar having a hole in a cupped end to fit over the shank of the bolt and having a length greater than a projecting end of the shank of the bolt when installed, and an open end defining a bore to receive the security nut such that the circular periphery of the security nut extends into close conformity with the bore of the collar;
(d) a dust cover fitted into the open end of the collar;
(e) a security strap securing the dust cover in place; and
(f) a complimentary key for fitting and releasing the nut, the key having an aperture to receive the projecting end of the bolt shank.

* * * * *

UNITED STATES PATENT AND TRADEMARK OFFICE
CERTIFICATE OF CORRECTION

PATENT NO. : 6,908,273 B2
DATED : June 21, 2005
INVENTOR(S) : Sean K. Mackay

It is certified that error appears in the above-identified patent and that said Letters Patent is hereby corrected as shown below:

Column 4,
Line 13, after "having", -- a -- should be inserted.
Line 23, "," should be -- ; --.
Line 25, before "complimentary", -- a -- should be inserted.
Lines 43 and 47, "am" should be -- as --.
Line 58, "in" should be -- is --.

Column 5,
Lines 2 and 12, "end" should be -- and --.

Column 6,
Line 7, "projected" should be -- projects --.

Signed and Sealed this

Fourth Day of October, 2005

JON W. DUDAS
*Director of the United States Patent and Trademark Office*